United States Patent
Cymbal et al.

(10) Patent No.: US 8,291,596 B2
(45) Date of Patent: Oct. 23, 2012

(54) METHOD OF ASSEMBLING A BEARING ASSEMBLY

(75) Inventors: William D. Cymbal, Freeland, MI (US); Douglas P. Wendling, Chesaning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 919 days.

(21) Appl. No.: 12/336,309

(22) Filed: Dec. 16, 2008

(65) Prior Publication Data
US 2010/0150491 A1   Jun. 17, 2010

(51) Int. Cl.
*B21K 1/04* (2006.01)

(52) U.S. Cl. ............ 29/898.063; 29/898.06; 29/898.061; 29/898.062; 29/898.07; 29/898.15; 384/499; 384/501

(58) Field of Classification Search ........... 29/898.06–898.069, 898.07, 898.15; 384/499–503, 505, 506, 492
See application file for complete search history.

(56) References Cited

U.S. PATENT DOCUMENTS

| | | | | |
|---|---|---|---|---|
| 3,626,564 A * | 12/1971 | Daniel | ...................... | 29/898.066 |
| 3,732,606 A * | 5/1973 | de Germond | ............ | 29/898.063 |
| 4,048,702 A * | 9/1977 | Garnett | ...................... | 29/898.062 |
| 4,475,777 A * | 10/1984 | Hofmann et al. | ............. | 384/572 |
| 4,603,982 A | 8/1986 | Dittrich | | |
| 4,620,805 A | 11/1986 | Belanger | | |
| 5,219,231 A | 6/1993 | Sheedy | | |
| 5,630,669 A | 5/1997 | Stewart | | |
| 6,715,923 B2 * | 4/2004 | Miyazaki et al. | ............. | 384/500 |
| 7,270,484 B2 | 9/2007 | Waseda | | |
| 7,909,514 B2 * | 3/2011 | Plona | ............................. | 384/499 |

FOREIGN PATENT DOCUMENTS

| | | |
|---|---|---|
| EP | 0390784 B1 | 2/1996 |
| EP | 1600648 A2 | 11/2005 |
| JP | 1266321 | 10/1989 |
| WO | WO 8902989 | 4/1989 |

\* cited by examiner

*Primary Examiner* — Sarang Afzali
(74) *Attorney, Agent, or Firm* — Cantor Colburn LLP

(57) ABSTRACT

A bearing includes a first inner race half and a second inner race half, and a first outer race half and a second outer race half. A cage defining a plurality of openings supports a plurality of rollers. The bearing is assembled by positioning the first inner race half on a mandrel and the first outer race half on a work support, positioning the cage with the rollers supported in the openings adjacent to and concentric with the first inner race half and the first outer race half. The second inner race half and the second outer race half are positioned adjacent the first inner race half and the first outer race half respectively. The first inner race half and the second inner race half, and the first outer race half and the second outer race half are then bonded together to form the bearing assembly.

14 Claims, 3 Drawing Sheets

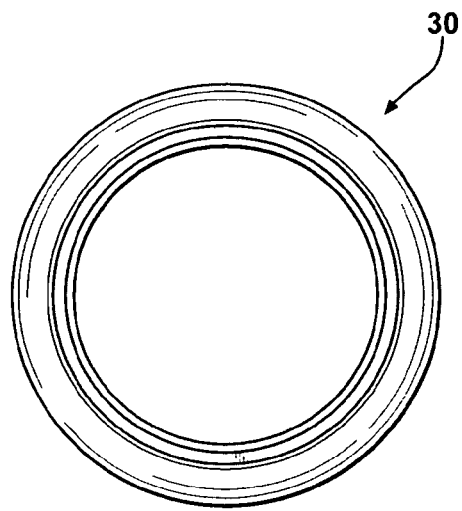
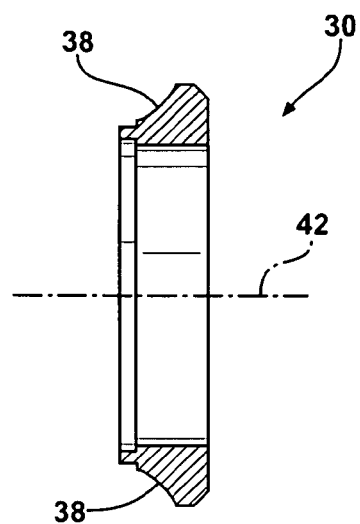
FIG. 1  FIG. 2
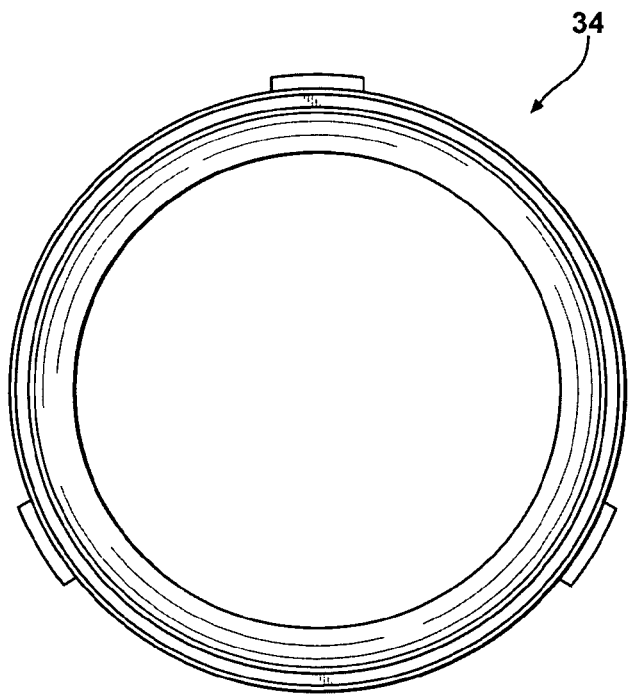
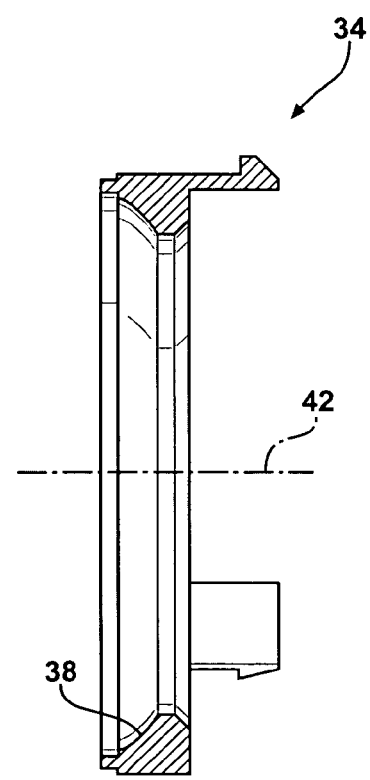
FIG. 3  FIG. 4

METHOD OF ASSEMBLING A BEARING ASSEMBLY

BACKGROUND OF THE INVENTION

1. Field of the Invention

The subject invention generally relates to a bearing assembly, and more specifically the subject invention relates to a method of assembly the bearing assembly.

2. Description of the Prior Art

Bearings often include an inner race, an outer race, and a plurality of rollers disposed between the inner race and the outer race to provide rolling engagement between the inner race and the outer race. The rollers are often supported by a cage disposed between the inner race and the outer race. The cage defines a plurality of openings, with one of the rollers disposed within each of the openings. The inner race and the outer race each define a plurality of grooves, with one of the rollers disposed within each of the grooves.

It is known to manufacture the inner race and the outer race from a polymer material, i.e., a plastic. When the inner race and the outer race are manufactured from a polymer, they are often formed in a die. However, when formed in a die, the grooves of the inner race and the outer race are required to be shallow to allow for removal of the inner race and the outer race from the die. The shallow grooves limits the polymer bearing to a low axial load capacity. Alternatively, it is known to mold the inner race and the outer race, and then machine the grooves into the inner race and the outer race. While machining the grooves after molding the inner race and the outer race permits deeper grooves, and thereby a higher axial load capacity, the machining process removes the outer layer of the polymer material, i.e., the skin of the polymer. Removal of the outer layer of the polymer material reduces the wear resistance of the polymer, thereby reducing the life expectancy of the bearing assembly.

SUMMARY OF THE INVENTION AND ADVANTAGES

The subject invention provides a method of assembling a bearing assembly. The bearing assembly includes an inner race having a first inner race half and a second inner race half, and outer race having a first outer race half and a second outer race half. The bearing assembly further includes a plurality of rollers and an annular cage defining a plurality of openings. The method comprises the steps of positioning the first inner race half on a mandrel. The method further comprises positioning the first outer race half on a work support concentrically located relative to and radially offset from the first inner race half along a longitudinal axis. The method further comprises positioning one of the plurality of rollers within each of the plurality of openings of the cage to define a cage assembly. The method further comprises positioning the cage assembly adjacent to and concentric with the first inner race half and the first outer race half. The method further comprises positioning the second inner race half on the mandrel adjacent to the first inner race half. The method further comprises positioning the second outer race half on the work support adjacent to the first outer race half. The method further comprises compressing the first inner race half against the second inner race half and the first outer race half against the second outer race half along the longitudinal axis. The method further comprises bonding the first inner race half to the second inner race half to form the inner race and the first outer race half to the second outer race half to form the outer race with the cage assembly secured between the inner race and the outer race.

Accordingly, the subject invention allows the inner race and the outer race to be formed in a die with deep roller grooves by forming the inner race and the outer race in halves and then bonding the halves together. Forming the inner race and the outer race with the deep groves in halves provides a high axial load capacity, while still permitting the halves to be removed from the die. Therefore, the subject invention provides a method of assembling a bearing that permits casting deep grooves into the inner race and the outer race to provide a high axial load capacity without the need to machine the deep grooves into the inner race and the outer race, thereby retaining the outer layer of the polymer material and increasing the life expectancy of the bearing assembly.

BRIEF DESCRIPTION OF THE DRAWINGS

Other advantages of the present invention will be readily appreciated, as the same becomes better understood by reference to the following detailed description when considered in connection with the accompanying drawings.

FIG. 1 is a plan view of a first inner race half of a bearing assembly.

FIG. 2 is a cross sectional view along a longitudinal axis of the first inner race half.

FIG. 3 is a plan view of a first outer race half of the bearing assembly.

FIG. 4 is a cross sectional view along the longitudinal axis of the first outer race half.

DETAILED DESCRIPTION OF THE INVENTION

Referring to the Figures, wherein like numerals indicate corresponding parts throughout the several views, a bearing assembly is shown generally at 20. The bearing assembly 20 rotatably supports a first member relative to a second member as is well known.

Figure 5:
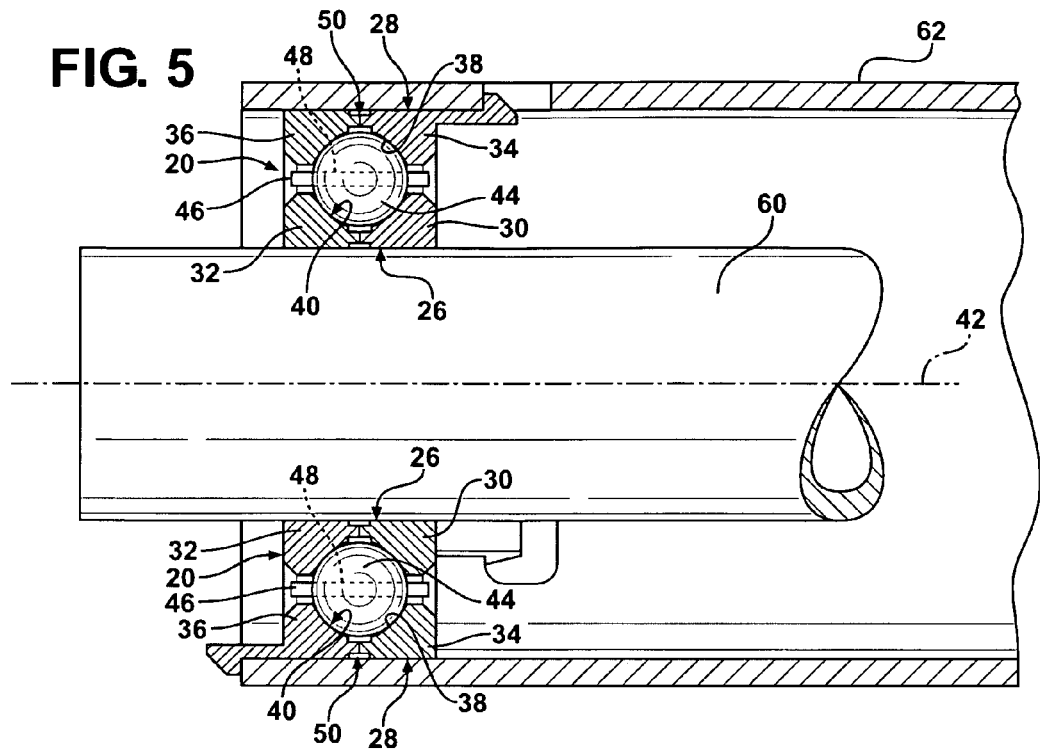
FIG. 5 is a cross sectional view along the longitudinal axis of the first and second inner race halves supported by a mandrel and the first and second outer race halves supported by a work support for assembly.

Referring to FIGS. 1 through 4, the bearing assembly 20 includes an inner race 26 and an outer race 28. As best shown in FIG. 5, the inner race 26 includes a first inner race half 30 and a second inner race half 32. The outer race 28 includes a first outer race half 34 and a second outer race half 36. The first inner race half 30, the second inner race half 32, the first outer race half 34 and the second outer race half 36 are formed from a polymer, i.e., a plastic. The polymer may include, but is not required to include, a nylon, such as nylon 6 or nylon 6/6. Alternatively, the polymer may include some other polymeric material.

The first inner race 30, the second inner race 32, the first outer race 34 and the second outer race 36 each define a groove portion that cooperates with the groove portions of the other of the first inner race 30, the second inner race 32, the first outer race 34 and the second outer race 36 to define an annular groove 38. The annular groove 38 encircles and is concentric with a longitudinal axis 42. The annular groove 38 preferably defines a circular cross section cut along the longitudinal axis 42. However, it should be appreciated that the cross section of the annular groove 38 along the longitudinal axis 42 may define some other shape.

As best shown in FIG. 5, the bearing assembly 20 further includes a plurality of rollers 44. The rollers 44 are disposed within the annular groove 38 defined by the inner race 26 and the outer race 28. Preferably, the plurality of rollers 44 is further defined as a plurality of balls having a spherical shape. However, it should be appreciated that the rollers 44 may include some other shape, such as cylindrical. It should be appreciated that the cross sectional shape of the annular groove 38 along the longitudinal axis 42 corresponds with the shape of the rollers 44, i.e., spherical rollers 44 correspond to a circular cross sectional shape of the annular groove 38.

As best shown in FIG. 5, the bearing assembly 20 may include an annular cage 46. The annular cage 46 is disposed between the inner race 26 and the outer race 28. The annular cage 46 defines a plurality of openings 48. One of the rollers 44 is disposed within each of the openings 48. The annular cage 46 supports the rollers 44 relative to the inner race 26 and the outer race 28. Additionally, the annular cage 46 helps maintain the position of the rollers 44 relative to each other, the inner race 26 and the outer race 28.

Figure 6:
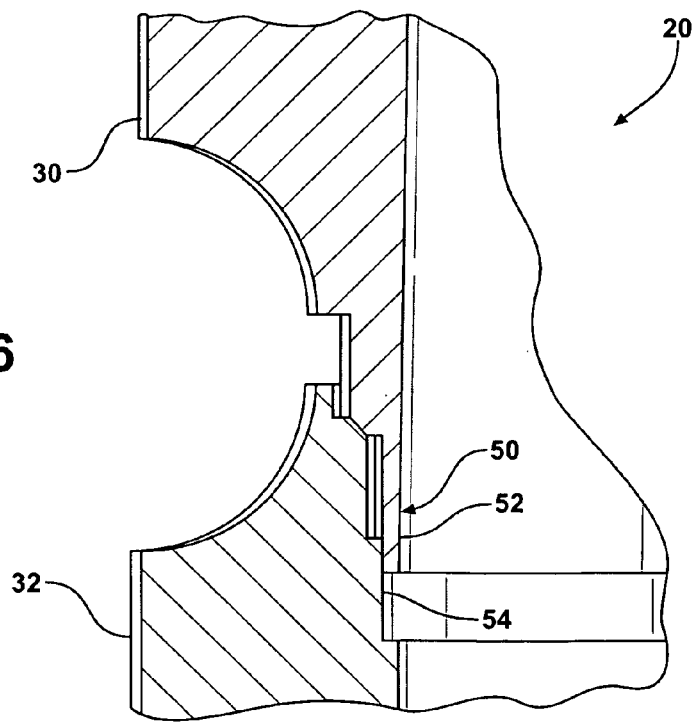
FIG. 6 is an enlarged fragmentary cross sectional view of the bearing assembly perpendicular to the longitudinal axis prior to assembly.
Figure 7:
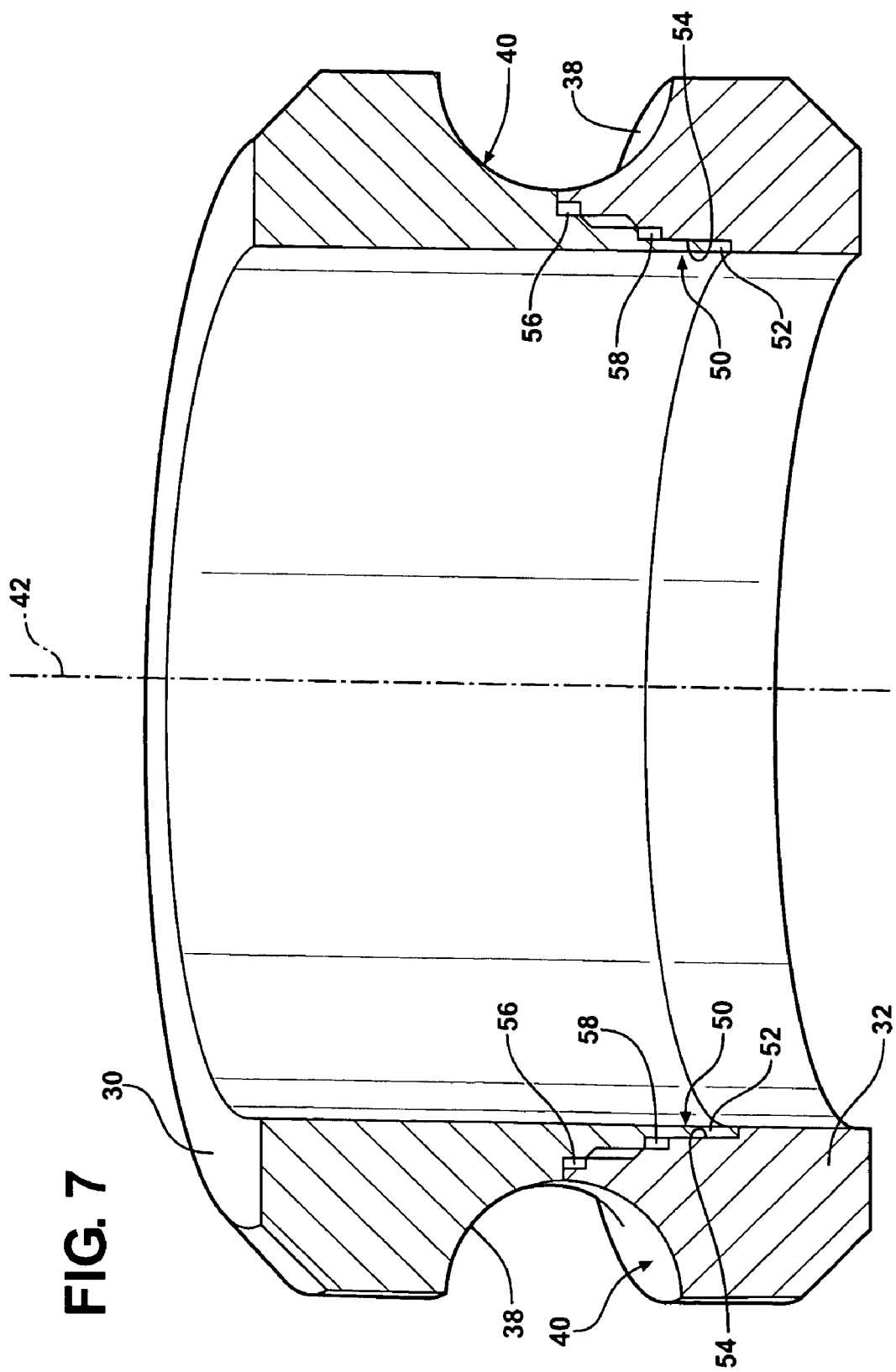
FIG. 7 is a cross sectional view perpendicular to the longitudinal axis of the bearing assembly.

Referring to FIGS. 6 and 7, the first inner race half 30 and the second inner race half 32 may include alignment features 50 to align the first inner race half 30 with the second inner race half 32 about a longitudinal axis 42 relative to each other. Likewise, the first outer race half 34 and the second outer race half 36 may include alignment features 50 to align the first outer race half 34 with the second outer race half 36 about the longitudinal axis 42 relative to each other. The alignment features 50 may include any suitable geometric features shared between the first and second halves of the inner and outer races 26, 28 that ensure a proper concentric alignment of the first halves of the inner and outer races 26, 28 to the second halves of the inner and outer races 26, 28 respectively. The alignment features 50 may include, for example, one of the first halves and the second halves defining an alignment pin/s and the other of the first halves and the second halves defining an alignment bore/s for receiving the alignment pin/s therein. Alternatively, the alignment feature 50 may include one of the first halves and the second halves defining an annular lip 52 with the other of the first halves and the second halves defining an annular groove 54 for receiving the annular lip 52 therein. The annular lip 52 and the annular groove 54 may be tapered to facilitate a tight fit therebetween. It should be appreciated that the alignment features 50 may include other geometric features of the first half and the second half of the inner and outer races 26, 28 not shown or described herein.

The first inner race half 30 and the second inner race half 32 cooperate together to define a first flash trap 56. Likewise, the first outer race half 34 and the second outer race half 36 cooperate together to define a second flash trap 58. The first flash trap 56 and the second flash trap 58 each define a void, i.e., a volume, which permits the first half and the second half of the inner and the outer races 26, 28 to be tightly joined. The voids defined by the first flash trap 56 and the second flash trap 58 provide a location for any extraneous flashing disposed on either of the first and second halves of the inner and outer races 26, 28 respectively to be forced into when the first half and the second half of the inner and outer races 26, 28 are joined, described in greater detail below, thereby ensuring a proper fit therebetween.

It should be appreciated that one of the inner race 26 and the outer race 28 may include a drive interface cooperating with one of the first member and the second member. The drive interface may include a splined connection or the like. Preferably, an inner circumference of the inner race 26 defines the drive interface. The drive interface couples the inner race 26 to one of the first member and the second member for rotating the inner race 26 with one of the first member and the second member relative to the outer race 28.

Referring to FIGS. 5 through 7, the subject invention provides a method of assembling the bearing assembly 20. The method comprises forming the first inner race half 30, the second inner race half 32, the first outer race half 34 and the second outer race half 36 from a polymer. The step of forming the first inner race half 30, the second inner race half 32, the first outer race half 34 and the second outer race half 36 may further be defined as forming the first inner race half 30, the second inner race half 32, the first outer race half 34 and the second outer race half 36 in a die. Accordingly, the first inner race half 30, the second inner race half 32, the first outer race half 34 and the second outer race half 36 are cast in the die. There are several suitable methods of casting pieces utilizing dies known to those skilled in the art. As such, the method of casting a piece with a die is not described herein. However, it should be appreciated that the die defines the shape of the first inner race half 30, the second inner race half 32, the first outer race half 34 and the second outer race half 36. It should also be appreciated that the die may include separate dies for each of the first inner race half 30, the second inner race half 32, the first outer ace half and the second outer race half 36.

The die for the first inner race half 30, second inner race half 32, first outer race half 34 and the second outer race half 36 defines a plurality of groove portions. The step of forming the first inner race half 30, the second inner race half 32, the first outer race half 34 and the second outer race half 36 may further be defined as forming the first inner race half 30, the second inner race half 32, the first outer race half 34 and the second outer race half 36 to each define a groove portion formed by the die that cooperates with the other groove portions to define an annular groove 38 for receiving the rollers 44 therein.

The step of forming the first inner race half 30, the second inner race half 32, the first outer race half 34 and the second outer race half 36 may further be defined as forming the first inner race half 30, the second inner race half 32, the first outer race half 34 and the second outer race half 36 to include the alignment features 50, as described above, to align the first inner race half 30 with the second inner race half 32 and align the first outer race half 34 with the second outer race half 36. Additionally, the step of forming the first inner race half 30, the second inner race half 32, the first outer race half 34 and the second outer race half 36 may further be defined as forming the first inner race half 30 and the second inner race half 32 to cooperate together to define a first flash trap 56 and the first outer race half 34 and the second outer race half 36 to define a second flash trap 58.

The method further comprises positioning the first inner race half 30 on a mandrel 60, and positioning the first outer race half 34 on a work support 62. The first outer race half 34 is concentrically located relative to and radially offset from the first inner race half 30 along the longitudinal axis 42.

The method further comprises positioning one of the plurality of rollers 44 within each of the plurality of openings 48 of the cage to define a cage assembly 20. The cage assembly 20 is then positioned adjacent to and concentric with the first inner race half 30 and the first outer race half 34. The rollers 44 are positioned in the annular groove 38 defined by the first inner race half 30, the second inner race half 32, the first outer race half 34 and the second outer race half 36.

The method further comprises positioning the second inner race half 32 on the mandrel 60 adjacent to the first inner race half 30, and positioning the second outer race half 36 on the work support 62 adjacent to the first outer race half 34. It should be appreciated that each of the first inner race half 30, the second inner race half 32, the annular cage 46, the first outer race half 34 and the second outer race half 36 are concentrically located relative to the longitudinal axis 42.

The method further comprises compressing the first inner race half 30 against the second inner race half 32 and the first outer race half 34 against the second outer race half 36 along the longitudinal axis 42. Compressing the first inner race half 30 against the second inner race half 32 and the first outer race half 34 against the second outer race half 36 de-lashes the bearing assembly 20, i.e., removes any slack between the first inner race half 30 and the second inner race half 32 and between the first outer race half 34 and the second outer race half 36. Accordingly, compressing the first inner race half 30 and the second inner race half 32 ensures a good fit and provides a tight seam between the first inner race half 30 the second inner race half 32. Likewise, compressing the first outer race half 34 and the second outer race half 36 ensures a good fit and provides a tight seam between the first outer race half 34 and the second outer race half 36.

The method further comprises bonding the first inner race half 30 to the second inner race half 32 to form the inner race 26 and the first outer race half 34 to the second outer race half 36 to form the outer race 28 with the cage assembly 20 secured between the inner race 26 and the outer race 28. The step of bonding the first inner race half 30 to the second inner race half 32 and the first outer race half 34 to the second outer race half 36 may further be defined as welding the first inner race half 30 to the second inner race half 32 and the first outer race half 34 to the second outer race half 36.

The step of welding the first inner race half 30 to the second inner race half 32 and the first outer race half 34 to the second outer race half 36 may further include the step of melting a portion of each of the first inner race half 30, the second inner race half 32, the first outer race half 34 and the second outer race half 36. The portions of the first inner race half 30, the second inner race half 32, the first outer race half 34 and the second outer race half 36 are melted as the first inner race half 30 and the second outer race half 36 are compressed together and as the first outer race half 34 and the second outer race half 36 are compressed together, thereby mixing the melted portion of the first inner race half 30 with the melted portion of the second inner race half 32 to bond the first inner race half 30 to the second inner race half 32, and mixing the melted portion of the first outer race half 34 with the melted portion of the second outer race half 36 to bond the first outer race half 34 to the second outer race half 36. The void, i.e., volume, provided by the first flash trap 56 and the second flash trap 58 provides a space for the melted portions of the first inner race half 30, the second inner race half 32, the first outer race half 34 and the second outer race half 36 to flow into as the first inner race half 30, the second inner race half 32, the first outer race half 34 and the second outer race half 36 are compressed together, thereby mixing the melted portion of the first inner race half 30 and the second inner race half 32, and the first outer race half 34 and the second outer race half 36 respectively.

The step of welding the first inner race half 30 to the second inner race half 32 and the first outer race half 34 to the second outer race half 36 may further be defined as spin welding the first inner race half 30 to the second inner race half 32 and the first outer race half 34 to the second outer race half 36. The step of spin welding the first inner race half 30 to the second inner race half 32, and the first outer race half 34 to the second outer race half 36 further comprises the step of rotating the mandrel 60 to spin the first inner race half 30 relative to the second inner race half 32 and to spin the first outer race half 34 relative to the second outer race half 36. Rotating the first halves relative to the second halves generates heat between the first inner race half 30 and the second inner race half 32 and the first outer race half 34 and the second outer race half 36 respectively.

The step of spin welding the first inner race half 30 to the second inner race half 32, and the first outer race half 34 to the second outer race half 36 further comprises the step of rotatably releasing the work support 62 after sufficient frictional heat is generated between the first inner race half 30 and the second inner race half 32 and between the first outer race half 34 and the second outer race half 36. Releasing the work support 62 to allow the work support 62 to spin with the mandrel 60 permits the second inner race half 32 to spin with the first inner race half 30 and the second outer race half 36 to spin with the first outer race half 34. Permitting the second inner race half 32 and the second outer race half 36, both disposed on the work support 62, to rotate with the first inner race half 30 and the first outer race half 34, both disposed on the mandrel 60, after sufficient frictional heat has been generated therebetween respectively, bonds the first inner race half 30 to the second inner race half 32 and bonds the first outer race half 34 to the second outer race half 36. The method of spin welding two polymer, i.e., plastic, components together is well known in the art and is therefore not described in detail herein.

Alternatively, the step of welding the first inner race half 30 to the second inner race half 32 and the first outer race half 34 to the second outer race half 36 may further be defined as ultrasonic welding the first inner race half 30 to the second inner race half 32 and the first outer race half 34 to the second outer race half 36. The step of ultrasonic welding the first inner race half 30 to the second inner race half 32, and the first outer race half 34 to the second outer race half 36 further comprises the step of applying ultrasonic energy to the first inner race half 30 and the second inner race half 32 to generate frictional heat between the first inner race half 30 and the second inner race half 32, and applying ultrasonic energy to the first outer race half 34 and the second outer race half 36 to generate frictional heat between the first outer race half 34 and the second outer race half 36. The step of applying ultrasonic energy is further defined as introducing high frequency vibrations between the first inner race half 30 and the second inner race half 32, and between the first outer race half 34 and the second outer race half 36. The method of ultrasonic welding two polymer, i.e., plastic, components together is well known in the art, and is therefore not described in detail herein.

While the step of bonding the first inner race half 30 to the second inner race half 32, and the first outer race half 34 to the second outer race half 36 has herein been described to include spin welding or ultrasonic welding, it should be appreciated that the step of bonding may include other manners of bonding or attaching the first inner race half 30 and the second inner race half 32, and bonding or attaching the first outer race half 34 and the second outer race half 36.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of assembling a bearing assembly including an inner race having a first inner race half and a second inner race half, and outer race having a first outer race half and a second outer race half, a plurality of rollers and an annular cage defining a plurality of openings, said method comprising the steps of:

positioning the first inner race half on a mandrel;

positioning the first outer race half on a work support concentrically located relative to and radially offset from the first inner race half along a longitudinal axis;

positioning one of the plurality of rollers within each of the plurality of openings of the cage to define a cage assembly;

positioning the cage assembly adjacent to and concentric with the first inner race half and the first outer race half;

positioning the second inner race half on the mandrel adjacent to the first inner race half;

positioning the second outer race half on the work support adjacent to the first outer race half;

compressing the first inner race half against the second inner race half and the first outer race half against the second outer race half along the longitudinal axis; and bonding the first inner race half to the second inner race half to form the inner race and the first outer race half to the second outer race half to form the outer race with the cage assembly secured between the inner race and the outer race; wherein the step of bonding the first inner race half to the second inner race half and the first outer race half to the second outer race half is further defined as welding the first inner race half to the second inner race half and the first outer race half to the second outer race half.

2. A method as set forth in claim 1 wherein the first inner race half, the second inner race half, the first outer race half and the second outer race half comprise a polymer and the method further comprises the step of forming the first inner race half, the second inner race half, the first outer race half and the second outer race half from the polymer.

3. A method as set forth in claim 2 wherein the step of forming the first inner race half, the second inner race half, the first outer race half and the second outer race half is further defined as forming the first inner race half, the second inner race half, the first outer race half and the second outer race half in a die.

4. A method as set forth in claim 3 wherein the die defines a plurality of groove portions and the step of forming the first inner race half, the second inner race half, the first outer race half and the second outer race half is further defined as forming the first inner race half, the second inner race half, the first outer race half and the second outer race half to each define a groove portion formed by the die that cooperate together to define an annular groove for receiving the rollers therein.

5. A method as set forth in claim 4 further comprising the step of positioning the plurality of rollers in the annular groove defined by the first inner race half, the second inner race half, the first outer race half and the second outer race half.

6. A method as set forth in claim 2 wherein the step of forming the first inner race half, the second inner race half, the first outer race half and the second outer race half is further defined as forming the first inner race half, the second inner race half, the first outer race half and the second outer race half to include alignment features to align the first inner race half with the second inner race half and align the first outer race half with the second outer race half.

7. A method as set forth in claim 1 wherein the step of welding the first inner race half to the second inner race half and the first outer race half to the second outer race half is further defined as ultrasonic welding the first inner race half to the second inner race half and the first outer race half to the second outer race half.

8. A method as set forth in claim 7 further comprising the step of applying ultrasonic energy to the first inner race half and the second inner race half to generate frictional heat between the first inner race half and the second inner race half and applying ultrasonic energy to the first outer race half and the second outer race half to generate frictional heat between the first outer race half and the second outer race half.

9. A method as set forth in claim 8 wherein the step of applying ultrasonic energy is further defined as introducing high frequency vibrations between the first inner race half and the second inner race half, and between the first outer race half and the second outer race half.

10. A method as set forth in claim 1 wherein the step of welding the first inner race half to the second inner race half and the first outer race half to the second outer race half further includes the step of melting a portion of each of the first inner race half, the second inner race half, the first outer race half and the second outer race half as the first inner race half and the second inner race half are compressed together and the first outer race half and the second outer race half are compressed together to mix the melted portion of the first inner race half with the melted portion of the second inner race half to bond the first inner race half to the second inner race half and to mix the melted portion of the first outer race half with the melted portion of the second outer race half to bond the first outer race half to the second outer race half.

11. A method as set forth in claim 1 wherein said plurality of rollers is further defined as a plurality of balls.

12. A method as set forth in claim 1 wherein the first inner race half and the second inner race half are mirror images of each other and wherein the first outer race half and the second outer race half are mirror images of each other.

13. A method of assembling a bearing assembly including an inner race having a first inner race half and a second inner race half, and outer race having a first outer race half and a second outer race half, a plurality of rollers and an annular cage defining a plurality of openings, said method comprising the steps of:

positioning the first inner race half on a mandrel;

positioning the first outer race half on a work support concentrically located relative to and radially offset from the first inner race half along a longitudinal axis;

positioning one of the plurality of rollers within each of the plurality of openings of the cage to define a cage assembly;

positioning the cage assembly adjacent to and concentric with the first inner race half and the first outer race half;

positioning the second inner race half on the mandrel adjacent to the first inner race half;

positioning the second outer race half on the work support adjacent to the first outer race half;

compressing the first inner race half against the second inner race half and the first outer race half against the second outer race half along the longitudinal axis; and bonding the first inner race half to the second inner race half to form the inner race and the first outer race half to the second outer race half to form the outer race with the cage assembly secured between the inner race and the outer race, the first inner race half and the second inner race half to cooperate together to define a first flash trap and the first outer race half and the second outer race half to define a second flash trap.

14. A method of assembling a bearing assembly including an inner race having a first inner race half and a second inner race half, and outer race having a first outer race half and a second outer race half, a plurality of rollers and an annular cage defining a plurality of openings, said method comprising the steps of:

positioning the first inner race half on a mandrel;
positioning the first outer race half on a work support concentrically located relative to and radially offset from the first inner race half along a longitudinal axis;
positioning one of the plurality of rollers within each of the plurality of openings of the cage to define a cage assembly;
positioning the cage assembly adjacent to and concentric with the first inner race half and the first outer race half:
positioning the second inner race half on the mandrel adjacent to the first inner race half,
positioning the second outer race half on the work support adjacent to the first outer race half,
compressing the first inner race half against the second inner race half and the first outer race half against the second outer race half along the longitudinal axis; and
bonding the first inner race half to the second inner race half to form the inner race and the first outer race half to the second outer race half to form the outer race with the cage assembly secured between the inner race and the outer race the bonding comprising:
welding the first inner race half to the second inner race half and the first outer race half to the second outer race half, and the welding includes melting a portion of each of the first inner race half the second inner race half the first outer race half and the second outer race half as the first inner race half and the second inner race half are compressed together and the first outer race half and the second outer race half are compressed together to mix the melted portion of the first inner race half with the melted portion of the second inner race half to bond the first inner race half to the second inner race half and to mix the melted portion of the first outer race half with the melted portion of the second outer race half to bond the first outer race half to the second outer race half;

the first inner race half, the second inner race half, the first outer race half and the second outer race half comprise a polymer and the method further comprises:

forming the first inner race half, the second inner race half, the first outer race half and the second outer race half from the polymer, and the forming includes forming the first inner race half and the second inner race half to cooperate together to define a first flash trap and the first outer race half and the second outer race half to define a second flash trap with the first flash trap and the second flash trap providing a volume for the melted portions of the first inner race half, the second inner race half, the first outer race half and the second outer race half to flow into as the first inner race half, the second inner race half, the first outer race half and the second outer race half are compressed together respectively.

* * * * *